April 2, 1946.     K. ARMANTROUT     2,397,587
TRANSMISSION
Filed Jan. 1, 1944     2 Sheets-Sheet 1

Inventor:
Kenneth Armantrout
By: Edward C. Fitzbaugh
Atty.

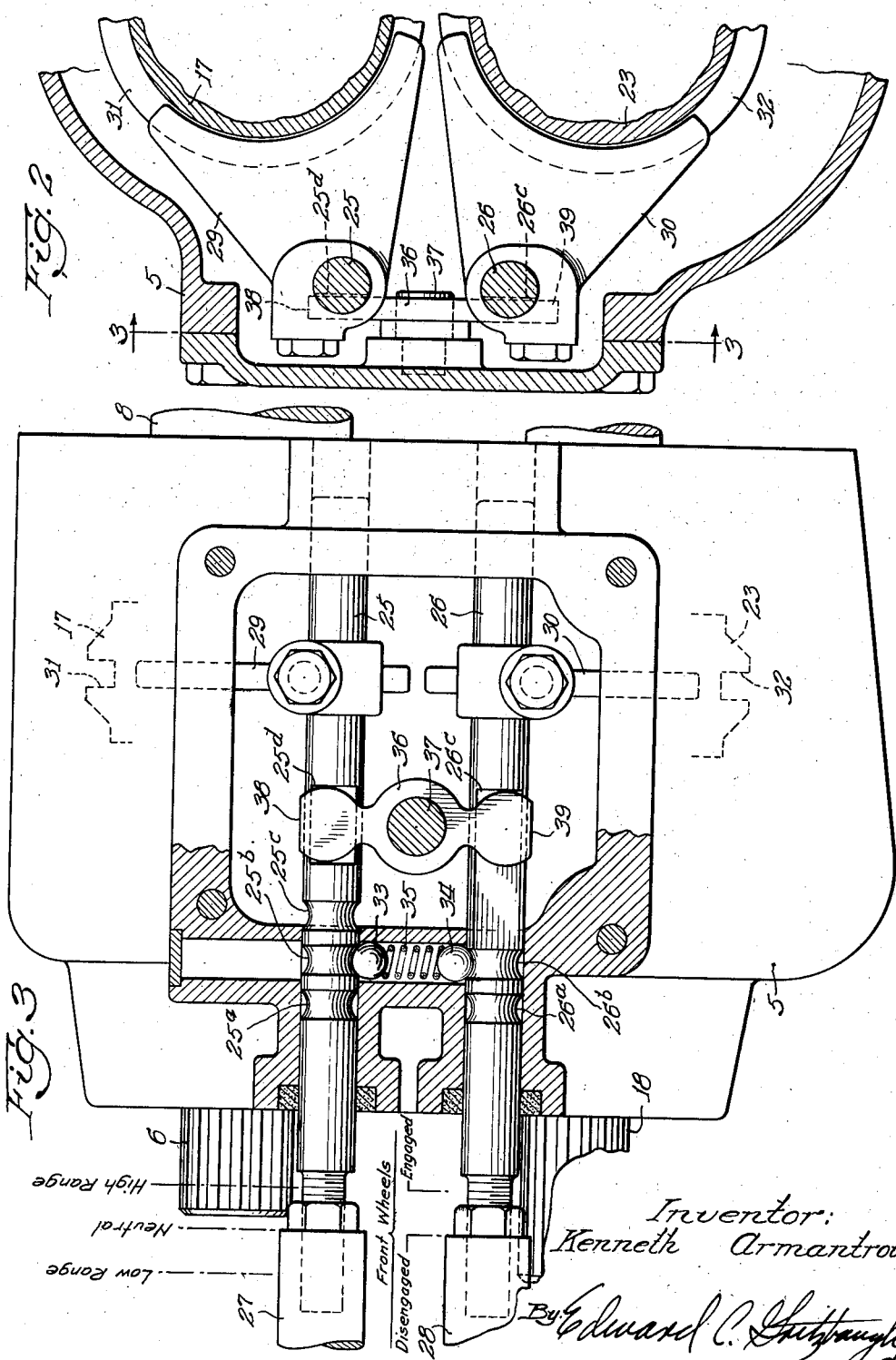

Patented Apr. 2, 1946

2,397,587

UNITED STATES PATENT OFFICE 2,397,587

TRANSMISSION

Kenneth Armantrout, Muncie, Ind., assignor to Borg-Warner Corporation, Chicago, Ill., a corporation of Illinois Application January 1, 1944, Serial No. 516,678

11 Claims. (Cl. 74—326)

My invention relates generally to transmissions, and the improvements contemplated herein relate more particularly to a transfer gearing assembly for driving both front and rear wheels of a vehicle in a low or high speed range. It is contemplated that the assembly shall be such that the rear wheels alone may be driven or a four-wheel drive may be provided in the high range, and that a four-wheel drive is assured in the low speed range.

The transfer assembly herein disclosed is especially suitable for use in military vehicles, such as the present, well-known "jeeps" which are frequently used under greatly varying field conditions ranging from good traction areas to marshy terrain. With the present improvements installed in such a vehicle, the operator, upon arriving at a poor traction area, may readily shift to low speed range, and upon such a shift, the drive will be transmitted to both the front and rear wheels of the vehicle. Such a four-wheel drive is provided in low speed range by reason of a positive interconnection between certain clutches which effect the change without requiring the operator to manipulate instrumentalities for individually shifting the clutches.

One of the principal objects of the present invention is to improve the operation of a transmission or transfer gearing assembly, such as contemplated herein.

Another object of the invention is to provide a transfer gearing assembly wherein, when a shift is made to low speed range, a drive solely to the rear wheels will be positively prevented, and both front and rear wheel drive will be provided.

A further object is to provide a transfer gearing assembly of this type of such construction that the vehicle may be driven in high range in the usual manner by means of only the rear wheels, or the vehicle may be selectively driven in high range by means of all four of the wheels of the vehicle.

Still another object hereof is to provide a novel interconnection between the clutches of a gearing transfer assembly for securing the advantageous operation hereinabove described.

The invention consists of the novel constructions, arrangements and devices to be hereinafter described and claimed for carrying out the above-stated objects, and such other objects as will appear from the following description of a certain preferred embodiment illustrated in the accompanying drawings wherein:

Fig. 2 is a fragmentary sectional view taken on the line 2—2 of Fig. 1; and

Fig. 3 is a sectional view taken on line 3—3 of Fig. 2.

Like characters of reference designate like parts in the several views of the drawings.

Figure 1:
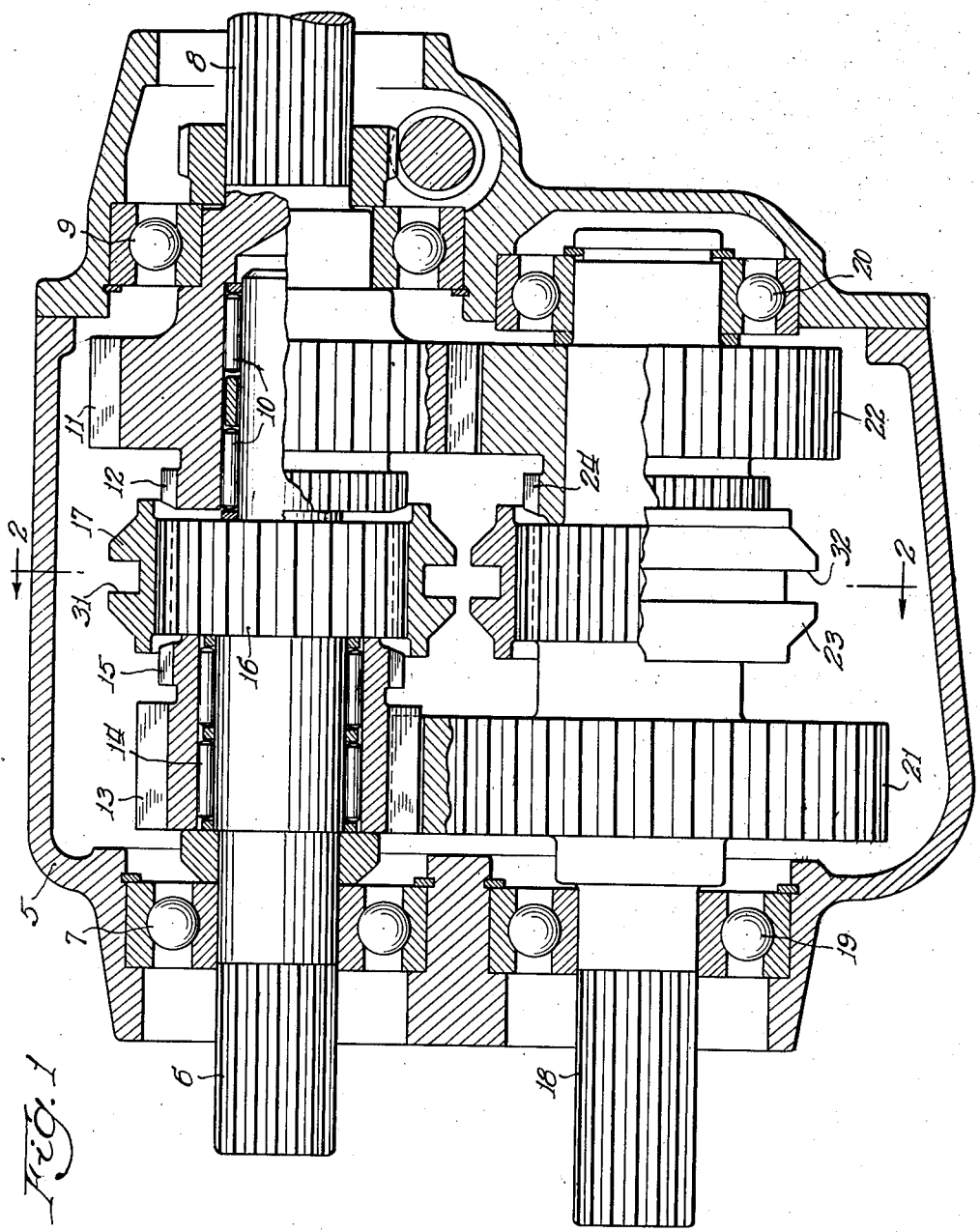
Fig. 1 is a vertical sectional view, taken through the axes of the driving and driven shafts, of a transfer gear assembly embodying the principles of the invention.

Referring to the drawings, the illustrated transmission comprises a transmission housing 5. A driving shaft 6 is journaled in the housing by suitable anti-friction bearings 7, and a driven shaft 8 is journaled in the housing by means of suitable anti-friction bearings 9. The drive shaft 6 is piloted in the driven shaft 8 by means of a suitable roller bearing 10, as shown. The shaft 6 is adapted to be connected with the source of motive power provided in the vehicle in which the illustrated transmission is installed, such as the motor of the vehicle or the driven shaft of the ordinary change speed transmission (not shown) commonly installed in a vehicle, and the driven shaft 8 is adapted to be connected with the rear wheels of the vehicle by any suitable shafting and gearing (not shown).

The driven shaft 8 on its portion surrounding the piloted end of the drive shaft 6 is provided with a gear 11 made integral with it, and the shaft 8 adjacent the gear is provided with clutch teeth 12. A gear 13 of smaller diameter than the gear 11 is mounted for free rotation on the drive shaft 6 by means of a suitable roller bearing 14, and this gear is provided with clutch teeth 15 formed integrally therewith. The shaft 6 is formed with an enlargement or boss 16 disposed between the inner ends of the gears 11 and 13. The periphery of the boss is splined, and a clutch sleeve 17 provided with internal splines is disposed on the boss with its splines interfitting with the splines on the boss, whereby the clutch sleeve is slidably and non-rotatably disposed on the boss. The splines in the clutch sleeve 17 are adapted to mesh with the clutch teeth 12 when the sleeve is moved toward the rear of the transmission, and the splines in the clutch sleeve are adapted to mesh with the clutch teeth 15 when the clutch sleeve is moved in the opposite direction toward the front of the transmission.

A countershaft 18 is journaled in the housing 5 so as to extend parallel with the shafts 6 and 8 by means of suitable bearings 19 and 20. The front portion of this countershaft projects forwardly out of the housing 5 and is adapted to be connected by means of any suitable shafting and gearing (not shown) with the front wheels of the vehicle. It is contemplated that the shafting and gearing connecting the shaft 18 with the front wheels of the vehicle shall be such as to be effective for driving the front wheels at the same ratio with respect to the shaft 18 as the rear wheels are driven with respect to the shaft 8.

The countershaft 18 has formed integrally thereon a gear 21 which is in mesh with the gear 13. A gear 22 is rotatably disposed on the countershaft 18 and is in mesh with the gear 11 formed on the driven shaft 8. The gear 22 is of the same diameter as the gear 11, and these two gears thereby rotate at the same speed relative to each other. The gear 21 fixed on the countershaft 18 is of larger diameter than the gears 11 and 22 and is also larger than the gear 13 with which it is in mesh.

Intermediate the gears 21 and 22, the countershaft 18 is provided with a splined periphery, and a clutch sleeve 23 which is internally splined is disposed on the splined portion of the shaft with its splines intermeshing with the splines of the shaft such that the clutch sleeve 23 is slidably but non-rotatably disposed on the shaft. The gear 22 is provided with clutch teeth 24 on its hub and adjacent the splined portion of the shaft 18, and the clutch sleeve 23 is adapted to mesh with the teeth 24 by means of its internal splines when the sleeve is moved toward the rear of the transmission.

It will be apparent that the clutch sleeve 17 may be moved rearwardly to interengage with the teeth 12 on the driven shaft 8, and the driven shaft will then be driven through the clutch sleeve 17 and teeth 12 at the same speed as the drive shaft 6. If the clutch sleeve 23 is in its neutral position out of mesh with the clutch teeth 24, as shown in the drawings, the front wheels will not be driven through the countershaft 18 when the shaft 8 is so driven in direct drive. If the clutch sleeve 23 is moved rearwardly to interengage with the teeth 24 when the shaft 8 is so driven in direct drive through the clutch sleeve 17 and the teeth 12, the countershaft 18 will be driven at the same speed as the shaft 8, since the gears 11 and 22 are of the same size, and the front wheels will rotate and be driven at the same speed as the rear wheels. If the clutch sleeve 17 is moved forwardly of the transmission to interengage with the teeth 15, while the clutch sleeve 23 is engaged with the teeth 24, the front wheels will be driven in low speed range through the clutch sleeve 17 and teeth 15 and the meshed gears 13 and 21, the reduced speed ratio being due to the smaller size of the gear 13 as compared with the gear 21. The rear wheels will also be driven in the low speed range due to the connection between the shaft 18 and the rear wheels by means of the clutch sleeve 23, the teeth 24, and the gears 11 and 22.

It has been found desirable that there should always be a four-wheel drive of the vehicle when the gears 13 and 21 are effective for providing the drive in low range. It has also been found desirable that when the clutch sleeve 17 and clutch teeth 12 are effective for providing a direct drive the front wheels may optionally be made operative for driving the vehicle along with the rear wheels. For these purposes, means interconnecting the two clutch sleeves 17 and 23 are provided whereby when the clutch sleeve 17 is moved in a forward direction to intermesh with the teeth 15, the clutch sleeve 23 is simultaneously moved rearwardly to couple the shaft 18 with the gear 22 so that both the front and rear wheels will be simultaneously driven in low range. The interconnection between the clutch sleeves 23 and 17 is such that when the clutch sleeve 17 is moved to interengage with the clutch teeth 12 to directly connect the shaft 6 with the shaft 8, the clutch sleeve 23 may, according to the wishes of the operator, be in its neutral position as shown in the drawings, whereby only the rear wheels of the vehicle are driven by means of the shaft 8, or the clutch sleeve 23 may be moved to interengage with the teeth 24 whereby the front wheels of the vehicle are also driven in the high range.

The mechanism interconnecting the clutch sleeves 17 and 23 and the mechanism for shifting the clutch sleeves are shown particularly in Figs. 2 and 3 of the drawings, reference to which will now be made. Upper and lower shift rails 25 and 26 are mounted in the housing 5 so as to be longitudinally reciprocatory, and the rails 25 and 26 are coupled respectively with operating rods 27 and 28. Any suitable means may be provided for actuating the rods 27 and 28 and such means are preferably within convenient reach of the operator for manual control thereof. The shift rails 25 and 26 have clutch shift yokes 29 and 30 secured to their intermediate portions for operative coaction with the clutch sleeves 17 and 23, respectively, the yokes having concave work edges that are engaged in annular channels 31 and 32 in the clutch sleeves.

In order to assist in properly positioning the shift rails, annular depressions 25a, 25b and 25c are formed in the rail 25, and annular depressions 26a and 26b are formed in the shift rail 26. A poppet ball 33 is provided in a suitable cavity in the housing 5 and is so disposed that the ball may cooperate with the depressions 25a, 25b and 25c, and a poppet ball 34 is so disposed in the cavity that the ball may cooperate with the depressions 26a and 26b. A spring 35 is provided in the cavity between the balls 33 and 34 for urging the balls into the depressions in the shift rails. The central depression 25b and the rear depression 26b in the respective shift rails 25 and 26 cooperate with the balls 33 and 34 to index the shift rails and thereby the clutch sleeves 17 and 23 in their neutral positions, in which positions they are shown in Fig. 1. The depression 25a in cooperation with the ball 33 functions to index the shift rail 25 in its position in which the sleeve 17 is engaged with the clutch teeth 12, and the depression 25c in cooperation with the ball functions to index the shift rail 25 in its position in which the clutch sleeve 17 is engaged with the clutch teeth 15. The depression 26a in cooperation with the ball 34 functions to index the shift rail 26 in its position in which the clutch sleeve 23 is interengaged with the clutch teeth 24.

Coordination between the shifting movements of the clutch sleeves 17 and 23 is provided by interconnecting the respective yokes and shift rails by means of a lever or walking beam 36 pivotally mounted on a pin or stud 37 fixed with respect to the housing 5 and projecting between the shift rails 25 and 26. The lever is formed with opposite lobe-shaped arms 38 and 39 which are disposed in slots 25d in shift rail 25, and 26c in shift rail 26, as is shown in Fig. 3. It will be observed that slot 25d is substantially shorter than slot 26c, the slot 25d receiving the lobe-shaped arm 38 to allow substantially no movement of the arm in the slot and the slot 26c being of such length as to allow a very substantial movement of the lobe-shaped arm 39 in the slot. The slots 25d and 26c are of such length and are so disposed in the shift rails that when the shift rail 25 is moved to bring the clutch sleeve 17 into interengagement with the clutch teeth 15, the lever 36 is rotated about the pin 37 and the arm 39 acts against an end of the slot 26c and functions to move the shift rail 26 to bring the clutch sleeve 23 into interengagement with the clutch teeth 24. While the shift rail 26 is in such position with the clutch sleeve 23 in interengagement with the clutch teeth 24, it will be observed that the rail 25 may be moved from its position bringing into interengagement the clutch sleeve 17 with the clutch teeth 15 to either of its other two positions with the clutch sleeve 17 being in neutral position, or being in position to interengage with the clutch teeth 12. It will be apparent also when the shift rail 25 is moved to bring the clutch sleeve 17 into interengagement with the clutch teeth 12, the elongated slot 26c will allow the shift rail 26 to be in either of its positions with the clutch sleeve 23 in neutral position or with the clutch sleeve 23 in interengagement with the clutch teeth 24. Such relative movements of the shift rails 25 and 26 are possible due to the provision of the elongated slot 26c in the shift rail 26, and it will be apparent that the arm 39 and the slot 26c constitute a lost motion connection between the lever 36 and shift rail 26.

It will be apparent that when the shift rail 25 is moved to bring the clutch sleeve 17 into engagement with the clutch teeth 15, the lever 36 functions with the slot 26c to move the shift rail 26 to interengage the clutch sleeve 23 with the clutch teeth 24, and thus when the gears 13 and 21 are made effective to provide a drive in low range, both the front and rear wheels are driven in such speed range. When the shift rail 25 is moved to interengage the clutch sleeve 17 with the clutch teeth 12, to provide a direct drive between the shafts 6 and 8, it will be apparent that according to the wishes of the operator the clutch sleeve 23 by means of the shift rail 26 and shift rod 28 may be either in neutral position whereby only the shaft 8 is driven in direct drive, or the clutch sleeve 23 may be moved into interengagement with the clutch teeth 24 whereby the countershaft 18 and thereby the front wheels are also driven.

I wish it to be understood that my invention is not to be limited to the specific constructions and arrangements shown and described, except only insofar as the claims may be so limited as it will be apparent to those skilled in the art that changes may be made without departing from the principles of the invention.

I claim:

1. A transfer assembly for motor vehicles, embodying a drive shaft, a driven shaft, and a countershaft; gearing connections between the respective shafts for providing a plurality of speed ratios therebetween, clutches on said drive shaft and said countershaft for effecting selective transfer of motion from said drive shaft to said driven shaft and said countershaft; and an interconnecting assembly operatively connecting said clutches, said assembly comprising reciprocating shift rails each connected to a sleeve of a clutch; and a walking beam having operative connection with said shift rails, the connection between said walking beam and shift rails permitting movement of one of said shift rails independently of the other shift rail, whereby the clutches on said drive shaft and said countershaft may be engaged concurrently when any of the plurality of speed ratios is established.

2. A transfer assembly for motor vehicles, embodying a drive shaft, a driven shaft, and a countershaft; gearing connections between the respective shafts for providing a plurality of speed ratios therebetween; clutches on said drive shaft and said countershaft for effecting selective transfer motion from said drive shaft to said driven shaft and said countershaft; and an interconnecting assembly operatively connecting said clutches, said assembly comprising reciprocating shift rails each supporting a sleeve of a clutch, said shift rails being provided with seats; and a walking beam the arms of which are engaged in the shift rail seats to effect an operative connection with said shift rails, the said connection effecting simultaneous movement of both shift rails and also permitting independent movement of one shift rail with respect to the other shift rail, whereby the clutches on said drive shaft and said countershaft may be engaged concurrently when any of the plurality of speed ratios is established.

3. A transfer assembly for motor vehicles, embodying a drive shaft, a driven shaft, and a countershaft spaced from said drive and driven shafts; gearing connections between the respective shafts for providing a plurality of speed ratios therebetween; clutches positioned opposite each other on said drive shaft and said countershaft for effecting selective transfer of motion from said drive shaft to said driven shaft and said countershaft; and an interconnecting assembly operatively connecting said clutches, said assembly comprising reciprocating shift rails disposed parallel to each other and to said shafts, said shift rails each connected to a sleeve of a clutch; a walking beam having operative connection with said shift rails for effecting simultaneous movement of the shift rails, and means providing a lost motion between said walking beam and a shift rail to permit independent movement of the said last-mentioned shift rail, whereby the clutches on said drive shaft and said countershaft may be engaged concurrently when any of the plurality of speed ratios is established.

4. In a transfer assembly which includes a drive shaft and driven shafts all having geared connection for providing a plurality of speed ratios between said drive shaft and said driven shafts, and clutches for effecting transfer of motion from the drive shaft to each of the driven shafts; an interconnection between said clutches embodying reciprocating shift rails connected to and selectively operating said clutches; and a walking beam connecting said shift rails to effect simultaneous actuation of said shift rails, the connection between said walking beam and said shift rails also permitting reciprocating movement of one of said shift rails independently of the other shift rail, whereby the clutches connected to said shift rails may be engaged concurrently when any of the plurality of speed ratios is established.

5. In a transfer assembly which includes a drive shaft and driven shafts all having geared connection for providing a plurality of speed ratios between said drive shaft and said driven shafts, and clutches for effecting transfer of motion from the drive shaft to each of the driven shafts; an interconnection between said clutches embodying reciprocating shift rails connected to and selectively operating said clutches; a walking beam connecting said shift rails to effect simultaneous actuation of said shift rails; and means providing a lost motion between said walking beam and a shift rail to permit independent reciprocating movement of the said last-mentioned shift rail, whereby the clutches connected to said shift rails may be engaged concurrently when any of the plurality of speed ratios is established.

6. In a transfer assembly which includes a drive shaft and driven shafts all having geared connection for providing a plurality of speed ratios between said drive shaft and said driven shafts, and clutches for effecting transfer of motion from the drive shaft to each of the driven shafts; an interconnection between said clutches embodying reciprocating shift rails connected to and selectively operating said clutches; a walking beam connecting said shift rails to effect simultaneous actuation of said shift rails; and slots in said shift rails engaged by the arms of said walking beam, one of said slots having greater length than the other slot to permit free movement of the walking beam arm in one direction and also to permit independent movement of one of said shift rails with respect to the other shift rail; the connection between said walking beam and said shift rails also permitting reciprocating movement of one of said shift rails independently of the other shift rail, whereby the clutches connected to said shift rails may be engaged concurrently when any of the plurality of speed ratios is established.

7. In a transfer assembly for a motor vehicle, the combination of a drive shaft, a driven shaft adapted to be connected to drive the rear wheels of the vehicle, a driven shaft adapted to be connected to drive the front wheels of the vehicle, a pair of clutches and a set of gearing, one of said clutches having an operative position for directly connecting said drive shaft and one of the driven shafts and having another operative position for completing a power train through the gearing to drive one of the driven shafts at reduced speed, said other clutch having an operative position for completing a power train through the gearing to connect the two driven shafts to rotate together, and a walking beam interconnecting the two clutches, said walking beam functioning to shift said second named clutch to operative position when said first named clutch is moved to its second named position whereby to provide a front and rear wheel drive at reduced speed and said walking beam having a lost motion connection with respect to one of the clutches so that the second named clutch may be moved in or out of operative position when said first named clutch is moved to its first named position whereby a direct drive for only one of the front and rear sets of wheels or for both sets of wheels may be provided.

8. In a transfer assembly for a motor vehicle, the combination of a drive shaft, a driven shaft adapted to be connected to drive the rear wheels of the vehicle, a driven shaft adapted to be connected to drive the front wheels of the vehicle, a pair of clutches and a set of gearing, one of said clutches having an operative position for directly connecting said drive shaft and said first named driven shaft and having another operative position for completing a power train through the gearing to drive said second named driven shaft at a reduced speed, said other clutch having an operative position for completing a power train through the gearing to connect the two driven shafts to rotate at the same speed, and a walking beam interconnecting the two clutches, said walking beam functioning to shift said second named clutch to operative position when said first named clutch is moved to its second named position whereby to provide a front and rear wheel drive at reduced speed and said walking beam having a lost motion connection with respect to said second named clutch so that the latter clutch may be moved in or out of operative position when said first named clutch is moved to its first named position whereby a direct drive for only the rear wheels or for both front and rear wheels may be provided.

9. In a transfer assembly for a motor vehicle, the combination of a drive shaft, a driven shaft adapted to be connected to drive the rear wheels of the vehicle, a driven shaft adapted to be connected to drive the front wheels of the vehicle, gearing adapted to drive one of said driven shafts at a reduced speed from said drive shaft, gearing for connecting said two driven shafts to rotate at the same speed, a clutch in one position connecting said drive shaft and one of the driven shafts in direct drive and in another position completing a power train through said first named gearing, a clutch for rendering said second named gearing operative, and a walking beam interconnecting said clutches whereby for shifting said second named clutch to operative position when said first named clutch is moved to its second named position, said walking beam having a lost motion connection with one of said clutches whereby the second named clutch may selectively be moved to operative or inoperative position when said first named clutch is moved to its first named position.

10. In a transfer assembly for a motor vehicle, the combination of a drive shaft, a driven shaft coaxially disposed with said drive shaft and adapted to be connected to drive the rear wheels of the vehicle, a driven shaft extending parallel to said first named shafts and adapted to be connected to drive the front wheels of the vehicle, a meshed pair of gears disposed on said drive shaft and said second named driven shaft and adapted to drive the latter shaft at a reduced speed from said drive shaft, a pair of meshed gears mounted on said driven shafts for connecting the shafts to rotate at the same speed, a clutch in one position connecting said drive shaft and said first named driven shaft for a direct drive between the shafts and in another position completing a power train through said first named gear set, and a clutch for completing a power train through said second named gear set, and a walking beam interconnecting said clutches whereby for shifting said second named clutch to operative position when said first named clutch is moved to its second named position, said walking beam having a lost motion connection with one of said clutches whereby the second named clutch may selectively be moved to operative or inoperative position when said first named clutch is moved to its first named position.

11. In a motor vehicle, the combination of a drive shaft, two driven shafts, one of said driven shafts being adapted to drive the rear wheels of the vehicle, the other driven shaft being adapted to drive the front wheels of the vehicle at the same speed ratio as the rear wheels are driven by the first named driven shaft, gearing adapted to drive said second named driven shaft at a reduced speed from said drive shaft, gearing for connecting said two driven shafts to rotate at the same speed, a clutch in one position connecting said drive shaft and said first named driven shaft in direct drive and in another position completing a power train through said first named gearing, a clutch for completing a power train through said second named gearing, and a walking beam interconnecting said clutches whereby for shifting said second named clutch to operative position when said first named clutch is moved to its second named position, said walking beam having a lost motion connection with one of said clutches whereby the second named clutch may selectively be moved to operative or inoperative position when said first named clutch is moved to its first named position.

KENNETH ARMANTROUT.